(12) United States Patent
Bellaouar et al.

(10) Patent No.: US 8,669,754 B2
(45) Date of Patent: Mar. 11, 2014

(54) LOW SUPPLY REGULATOR HAVING A HIGH POWER SUPPLY REJECTION RATIO

(75) Inventors: Abdellatif Bellaouar, Richardson, TX (US); Arul Balasubramaniyan, Plano, TX (US); Solti Peng, Plano, TX (US)

(73) Assignee: Icera Inc., Wilmington, DE (US)

( * ) Notice: Subject to any disclaimer, the term of this patent is extended or adjusted under 35 U.S.C. 154(b) by 525 days.

(21) Appl. No.: 13/081,239

(22) Filed: Apr. 6, 2011

(65) Prior Publication Data

US 2012/0256613 A1    Oct. 11, 2012

(51) Int. Cl.
    *G05F 3/16* (2006.01)
(52) U.S. Cl.
    USPC .......................... 323/314; 323/316
(58) Field of Classification Search
    USPC .................................. 323/312–317
    See application file for complete search history.

(56) References Cited

U.S. PATENT DOCUMENTS

| | | | |
|---|---|---|---|
| 5,485,074 A * | 1/1996 | Tomasini et al. | 323/315 |
| 5,576,616 A * | 11/1996 | Ridgers | 323/314 |
| 6,650,176 B1 | 11/2003 | Lorenz | |
| 6,753,724 B2 * | 6/2004 | Hanson | 327/543 |
| 7,508,184 B2 * | 3/2009 | Yen et al. | 323/314 |
| 2007/0103838 A1 | 5/2007 | Kimura | |

FOREIGN PATENT DOCUMENTS

GB    2330711 A    4/1999

* cited by examiner

*Primary Examiner* — Jessica Han

(57) ABSTRACT

A power supply noise rejection circuit for functional circuits, such as a voltage controlled oscillator (VCO). The power supply noise rejection circuit includes an isolation transistor connected to a voltage supply for providing an output current and voltage substantially free of noise across the full frequency range. A current source, a diode connected reference transistor with resistance means connected between its gate and drain terminals, and a dummy circuit serially connected between the voltage supply and ground generate a bias voltage that is applied to the gate of the isolation transistor. The dummy circuit mimics the DC characteristics of the functional circuit such that the output current tracks with process and temperature variations. The isolation transistor and the reference transistor can have negative threshold voltages, and the circuit can include bleed means for drawing current from the gate of the reference transistor and isolation transistor.

19 Claims, 10 Drawing Sheets

LOW SUPPLY REGULATOR HAVING A HIGH POWER SUPPLY REJECTION RATIO

FIELD OF THE INVENTION

The present invention relates generally to voltage supply regulators. More particularly, the present invention relates to voltage supply regulators with power supply noise rejection.

BACKGROUND OF THE INVENTION

Wireless devices have been in use for many years for enabling mobile communication of voice and data. Such devices can include mobile phones and wireless enabled personal digital assistants (PDA's) for example. FIG. 1 is a generic block diagram of the core components of such wireless devices. The wireless core 10 includes a base band processor 12 for controlling application specific functions of the wireless device and for providing and receiving voice or data signals to a radio frequency (RF) transceiver chip 14. The RF transceiver chip 14 is responsible for frequency up-conversion of transmission signals, and frequency down-conversion of received signals. RF transceiver chip 14 includes a receiver core 16 connected to an antenna 18 for receiving transmitted signals from a base station or another mobile device, and a transmitter core 20 for transmitting signals through the antenna 18. Those of skill in the art should understand that FIG. 1 is a simplified block diagram, and can include other functional blocks that may be necessary to enable proper operation or functionality.

Generally, the transmitter core 20 is responsible for up-converting electromagnetic signals from base band to higher frequencies for transmission, while receiver core 16 is responsible for down-converting those high frequencies back to their original frequency band when they reach the receiver, processes known as up-conversion and down-conversion (or modulation and demodulation) respectively. The original (or base band) signal may be, for example, data, voice or video. These base band signals may be produced by transducers such as microphones or video cameras, be computer generated, or transferred from an electronic storage device. In general, the high frequencies provide longer range and higher capacity channels than base band signals, and because high frequency radio frequency (RF) signals can propagate through the air, they are preferably used for wireless transmissions as well as hard-wired or fiber channels.

All of these signals are generally referred to as radio frequency (RF) signals, which are electromagnetic signals; that is, waveforms with electrical and magnetic properties within the electromagnetic spectrum normally associated with radio wave propagation.

Both the receiver core 16 and the transmitter core 20 will have oscillator circuits, such as voltage controlled oscillators (VCO), for generating local clock signals used for down-conversion or up-conversion of data signals to desired frequencies. The frequency of the VCO should be maintained as constant as possible; otherwise downstream operations which rely on the VCO output can be negatively affected, resulting in improper operation of the wireless device. For example, if the VCO is set to generate a frequency $f_0$, but generates $f_0+\Delta f$ where $\Delta f$ is an offset frequency shift, the receiver core (or transmit core) will process the data signals improperly.

Due to high integration of different circuit components, and the high operating frequencies of these components, an increasing amount of noise is generated. More importantly, the noise being generated will have a high frequency component, which leaks to the power supply that is used by sensitive circuits such as the VCO's. The noise propagating through the power supply can cause the $\Delta f$ to occur. There are circuits known in the art for rejecting noise in the power supply, but they are only effective for noise at certain frequencies. An example of a known power supply rejection circuit for a VCO is shown in FIG. 2.

FIG. 2 is a circuit schematic showing a known power supply rejection circuit 50 connected in line between a VDD power supply and a VCO 52. The function of power supply rejection circuit 50 is to filter out, or reject, noise appearing the power supply VDD, thereby providing a substantially noise-free VDD supply (labeled VDD_C) to VCO 52. The power supply rejection circuit 50 includes a p-channel transistor 54 having a source terminal connected to VDD and a drain terminal for providing VDD_C. The gate of transistor 54 is connected to an output of op-amp 56, which has one input for receiving a fed back VDD_C from the drain terminal of transistor 54. The other input of op-amp 56 receives a reference voltage REF. The VCO 52 includes a pair of cross-coupled p-channel transistors 58 and 60 and a pair of cross-coupled n-channel transistors 62 and 64. The common source terminals of p-channel transistors 58 and 60 receives VDD_C while the common source terminals of n-channel transistors 62 and 64 can be selectively connected to ground (VSS) by enabling transistor 66. Enabling transistor 66 has its gate terminal connected to enable signal EN to turn it on and off. An LC tank circuit 68 has a first end connected to the shared source/drain terminals of transistors 58 and 62, and a second end connected to the shared source/drain terminals of transistors 60 and 64.

There are two significant disadvantages of using the power supply rejection circuit 50 of FIG. 2. First, the op-amp 56 includes relatively large compensation capacitors having a capacitance between several pico farads to several hundred pico farads. Hence, there is a high cost to using this circuit as it will consume large silicon area relative to the actual VCO circuit. Second, the circuit does not reject power supply noise at the high frequencies that are prevalent in modern integrated devices. In particular since the op-amp 56 is powered by VDD, at high frequencies the noise can be coupled through the compensation capacitors to the drain terminal of p-channel transistor 54, and into VCO 52.

FIG. 3 is a graphical plot showing power rejection (PR) in dB vs. frequency (f) for the circuit of FIG. 2. PR is the power rejection ratio expressed as PR=20 Log (VDD/VDD_C). As illustrated in the plot of FIG. 2, power supply rejection is effective at the lower frequencies below $f_1$. In the circuit of FIG. 3, $f_1$ can be about 10 MHz, where the PR is maintained below −35 dB at frequencies below $f_1$. As the frequency of the noise increases beyond $f_1$, the power rejection becomes less effective until all the noise contaminates the power supplied to VCO 52. Unfortunately, much of the noise generated in modern integrated transceiver circuits lies above $f_1$.

It is, therefore, desirable to provide a power supply noise rejection circuit that rejects noise across a wide range of frequencies and uses less silicon area than currently available power supply rejection circuits.

SUMMARY OF THE INVENTION

It is an object of the present invention to obviate or mitigate at least one disadvantage of previous power supply rejection circuits.

In a first aspect, one embodiment provides a power supply rejection circuit for a functional circuit, which can include a voltage controlled oscillator for example. The power supply rejection circuit includes a dummy circuit and a current supply circuit. The dummy circuit receives a reference current and has circuit elements for emulating DC characteristics of the functional circuit. The current supply circuit receives a voltage supply for providing the reference current to the dummy circuit and an output current substantially free of noise in response to the reference current for the functional circuit. The reference current has a magnitude determined by the DC characteristics of the dummy circuit.

In a second aspect, an embodiment provides a power supply rejection circuit for providing an output current. The power supply rejection circuit includes a current source, a first transistor, resistance means, a dummy circuit, a second transistor, and bleed means. The current source is connected to a high voltage supply for providing a current. The first transistor has a first drain terminal for receiving the current and a first source terminal. The resistance means is connected between the first drain terminal and a first gate terminal of the first transistor. The dummy circuit is connected to the first source terminal and has specific DC characteristics for setting a bias voltage of the first gate terminal. The second transistor has a second drain terminal coupled to the high voltage supply, a second gate terminal connected to the first gate terminal, and a second source terminal for providing the output current. The bleed means draws voltage from the first gate terminal.

In a third aspect, an embodiment provides a wireless transceiver including a voltage controlled oscillator (VCO), an isolation transistor, a reference transistor, a resistance means, and a dummy circuit. The isolation transistor is coupled between a voltage supply and the VCO, and provides an output current in response to a bias voltage received at the isolation transistor gate terminal. The reference transistor provides a reference current in response to a current derived from a voltage supply. The resistance means couples the current to the reference transistor gate terminal for establishing the bias voltage in response to the reference current. The dummy circuit mimics DC characteristics of the VCO, and regulates a magnitude of the reference current.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a circuit for rejecting power supply noise for functional circuits, such as a voltage controlled oscillator (VCO). An isolation transistor connected to a voltage supply provides an output current and voltage substantially free of noise across the full frequency range, to the functional circuit in response to a bias voltage. A current source, a diode connected reference transistor with resistance means connected between its gate and drain terminals, and a dummy circuit serially connected between the voltage supply and ground generate the bias voltage. The dummy circuit mimics or emulates the DC characteristics of the functional circuit such that the output current tracks with process and temperature variations. The isolation transistor and the reference transistor can have negative threshold voltages, and the circuit can include bleed means for drawing current from the gate of the reference transistor and isolation transistor.

Figure 4:
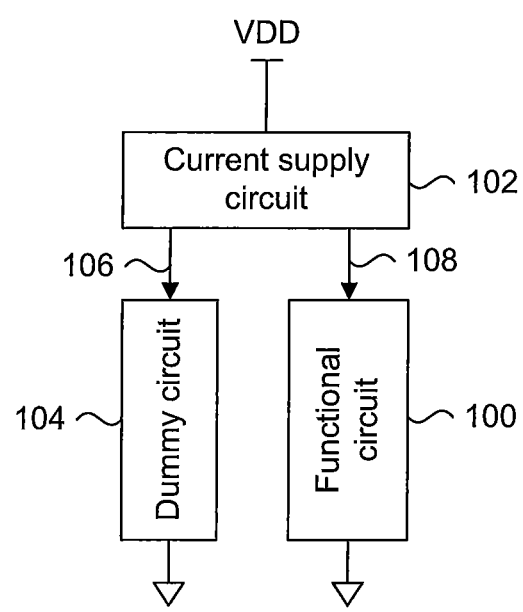
FIG. 4 is a block diagram of a functional circuit having full frequency range power supply rejection, according to an embodiment of the present invention.

FIG. 4 is a block diagram illustrating an embodiment of the power supply rejection circuit connected to a functional circuit. The functional circuit 100 can be any type of circuit which has low tolerance to power supply noise. The power rejection circuit includes a current supply circuit 102 and a dummy circuit 104. The current supply circuit 102 receives the voltage supply VDD, and provides a reference current 106 to the dummy circuit 104 and a substantially noise-free voltage supply and output current 108 to the functional circuit 100. The magnitude of the reference current 106 will depend on the dummy circuit 104, and in particular, the DC characteristics of the dummy circuit 104 which should be substantially identical to those of the functional circuit 100. The dummy circuit 104 preferably includes the same circuit elements used in the functional circuit 100 for matching the DC characteristics thereof. These circuit elements can be scaled with respect to those same circuit elements in the functional circuit. A substantially noise-free voltage supply and output current will have less than −35 db between 10 Hz and 8 GHz.

In operation, the dummy circuit 104 receives the reference current 106 from the current supply circuit 102. The reference current 106 flowing through the dummy circuit 104 is used to regulate the output current 108 provided to the functional circuit 100. More specifically, since the dummy circuit emulates the DC characteristics of the functional circuit 100, the functional circuit 100 becomes more tolerant to process and temperature by tracking the functional circuit over process and temperature variations. The power supply rejection ratio is improved by using the dummy circuit. According to the present embodiment, no capacitors or capacitor elements are used in the current supply circuit 102, thereby substantially reducing the size of the circuit relative to known circuits of the prior art. Furthermore, the absence of capacitors eliminates potential paths through which high frequency noise can "leak" into the functional circuit.

Figure 5:
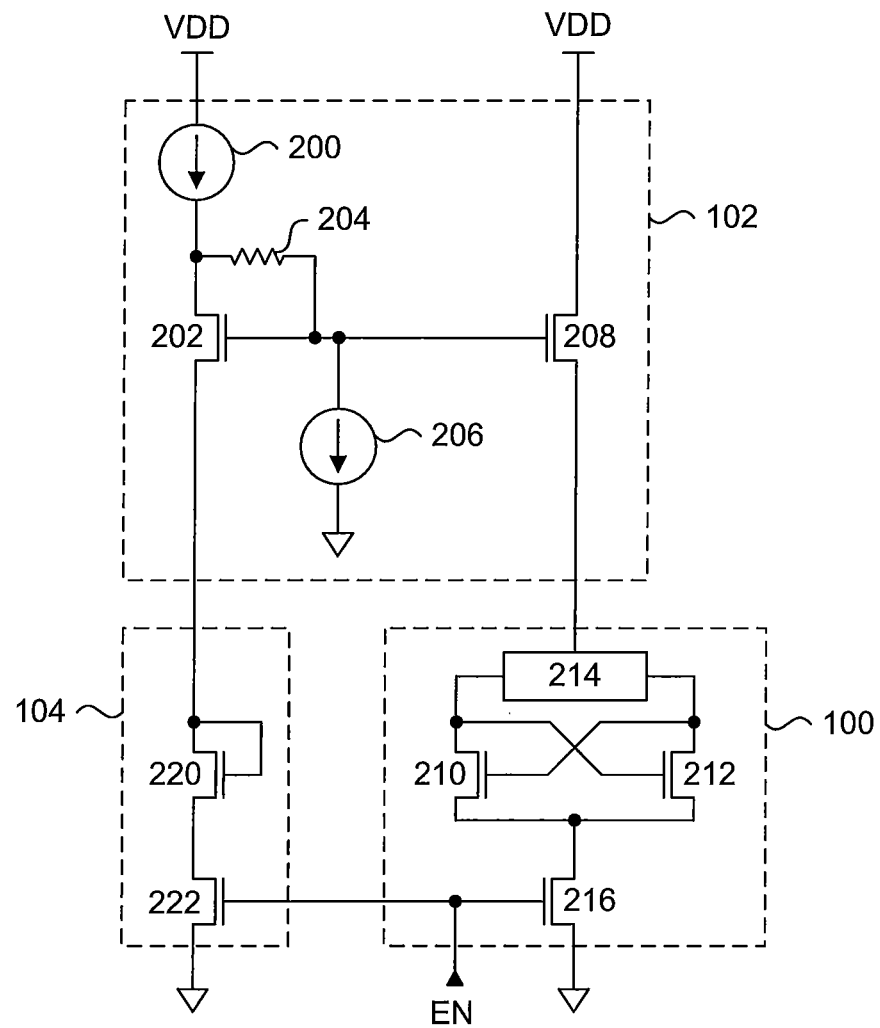
FIG. 5 is a circuit schematic of a VCO circuit having full frequency range power supply rejection, according to an embodiment of the present invention.

FIG. 5 is a circuit schematic showing details of a power supply rejection circuit according to an embodiment of the present invention, connected to a functional circuit. The power supply rejection circuit includes a current supply circuit 102 and a dummy circuit 104. In the presently shown example embodiment, the functional circuit 100 is a VCO circuit. Details of the circuits of FIG. 5 will now be described.

The current supply circuit 102 includes two current branches. The first current branch includes a current source 200 connected in series between supply voltage VDD and an n-channel diode connected reference transistor 202. The current source 200 can be implemented as a band gap current source or a proportional to absolute temperature (PTAT) referenced current source. Alternatively, current source 200 can be programmable in order to tailor the desired amount of current. A resistance means 204 is connected between the drain terminal and gate terminal of reference transistor 202. Resistance means 204 can be implemented as a resistor which maintains the drain terminal of reference transistor 202 at a higher voltage than the gate terminal voltage. This is used to keep reference transistor 202 operating in saturation mode, as will be described in further detail later. Any suitable resistance value for resistance means 204 can be used. A reference current is provided from the source terminal of reference transistor 202 to the dummy circuit 104. In the presently shown example, reference transistor 202 can be an n-channel native transistor device having a threshold voltage between 0 V and −0.1 V. Alternately, an n-channel depletion mode transistor can be used in place of reference transistor 202.

It is desirable to keep reference transistor 202 operating in saturation mode to maintain a constant reference current. If reference transistor 202 has a negative threshold voltage, a bleed means 206 is provided for drawing current from the gate of reference transistor 202 to ground. Bleed means 206 can be implemented as a current source for example. Current source 200, resistance means 204, and bleed means 206 establish a bias voltage on the gate terminal of reference transistor 202, which also depends in part on the magnitude of the reference voltage through the dummy circuit 104. Hence the output current is generated in response to the reference current. The second current branch includes an isolation transistor 208 connected between the voltage supply VDD and the VCO 100. The gate terminal of isolation transistor 208 is connected to the gate of reference transistor 202. It is noted that reference transistor 202 and isolation transistor 208 are arranged in a current mirror configuration.

The VCO circuit 100 is a straightforward circuit that includes a pair of cross-coupled n-channel transistors 210 and 212, an LC tank circuit 214, and an n-channel enabling transistor 216 for coupling the shared terminals of transistors 210 and 212 to ground. The LC tank circuit receives the output current and the substantially noise-free supply voltage VDD from current supply circuit 102.

The dummy circuit 104 includes the same circuit elements used in the VCO circuit 100, in order to simulate the DC characteristics of the VCO circuit 100. In the present example, dummy circuit 104 includes a dummy diode connected n-channel transistor 220 in series with a dummy enabling transistor 222. Dummy transistor 220 mirrors transistor 210 or 212 while dummy enabling transistor 222 mirrors enabling transistor 216. Dummy enabling transistor 222 receives the same enable signal EN as enabling transistor 216. Dummy transistors 220 and 222 can be sized the same as their counterpart transistors, or can be scaled down in size. Therefore, temperature and process effects experienced by the dummy circuit 104 will affect the reference current flowing therethrough, which can then be mirrored in the VCO circuit 100 by controlling isolation transistor 208.

Figure 1:
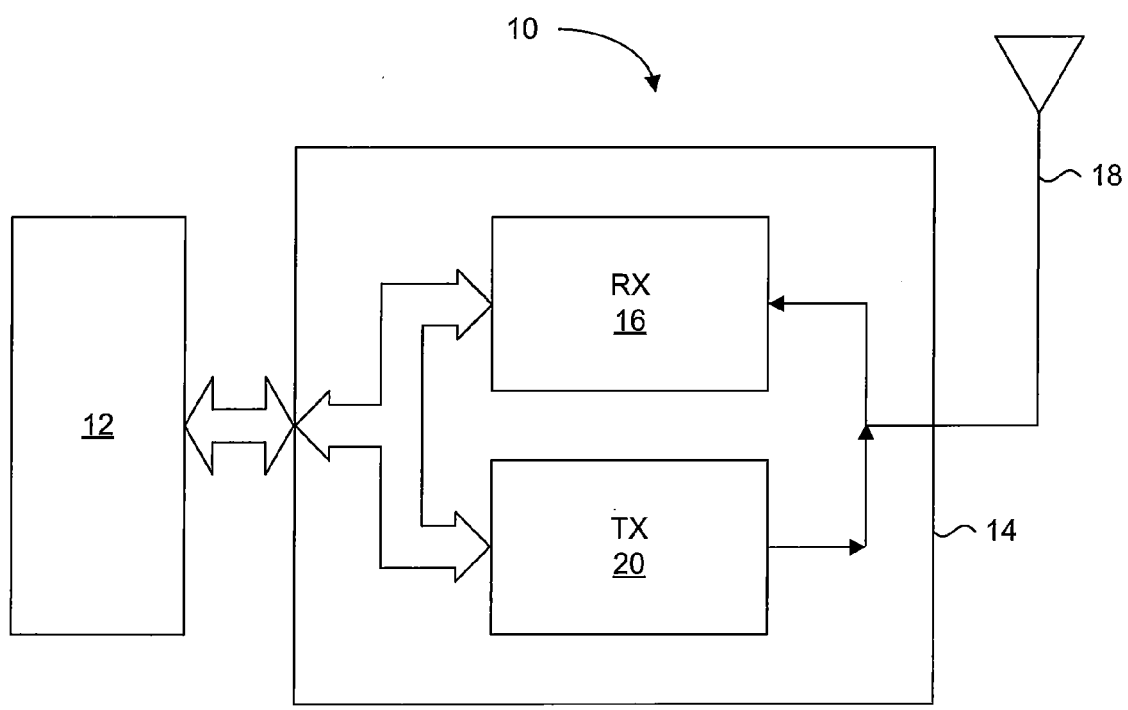
FIG. 1 is a block diagram of core components of a wireless device.
Figure 2:
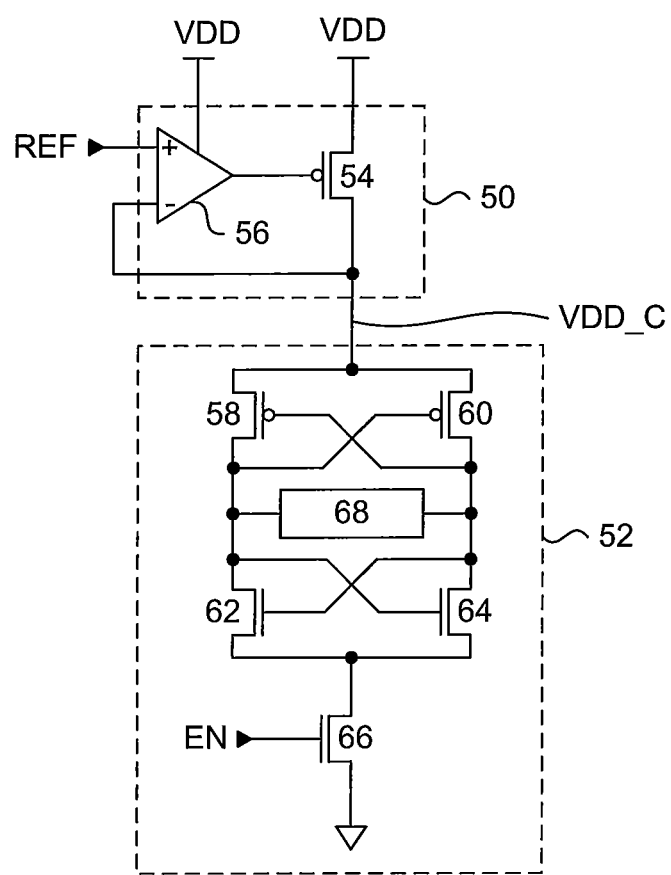
FIG. 2 is a circuit schematic of a VCO circuit with a power supply rejection circuit of the prior art.
Figure 3:
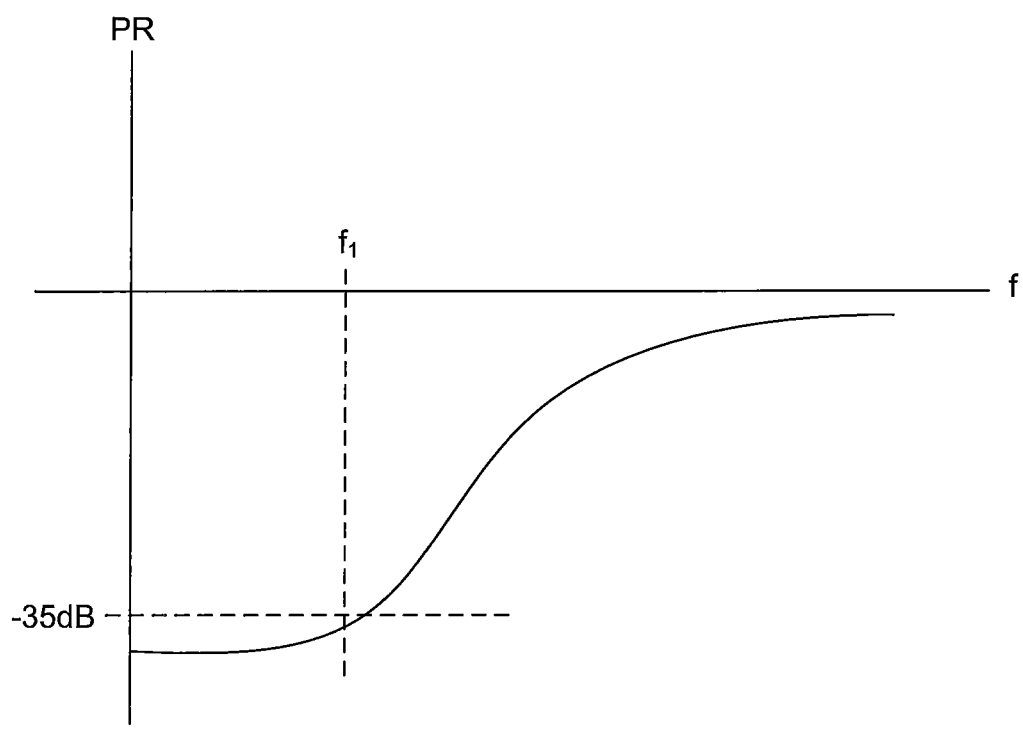
FIG. 3 is a graphical plot of power rejection vs. frequency for the circuit of FIG. 2.

The power supply rejection circuit shown in FIG. 5 provides some benefits over the circuit of the prior art. The size of the circuit will not occupy significant chip area as there are no space-consuming capacitors in the circuit. The space savings can contribute directly to a cost savings since the area of the wireless device chip can be reduced relative to a device using the prior art circuit of FIG. 2. If the reference transistor and the isolation transistor are native devices, they can deliver significant amounts of current with a very small gate voltage. Furthermore, since the native devices have very low threshold voltages, there is a minimized overhead. This means that there is a minimized voltage drop across the native transistor, thereby allowing for use of very low VDD power supply voltages. By using an n-channel device for the isolation transistor, the high frequency noise is effectively blocked from reaching the functional circuit.

Figure 6:
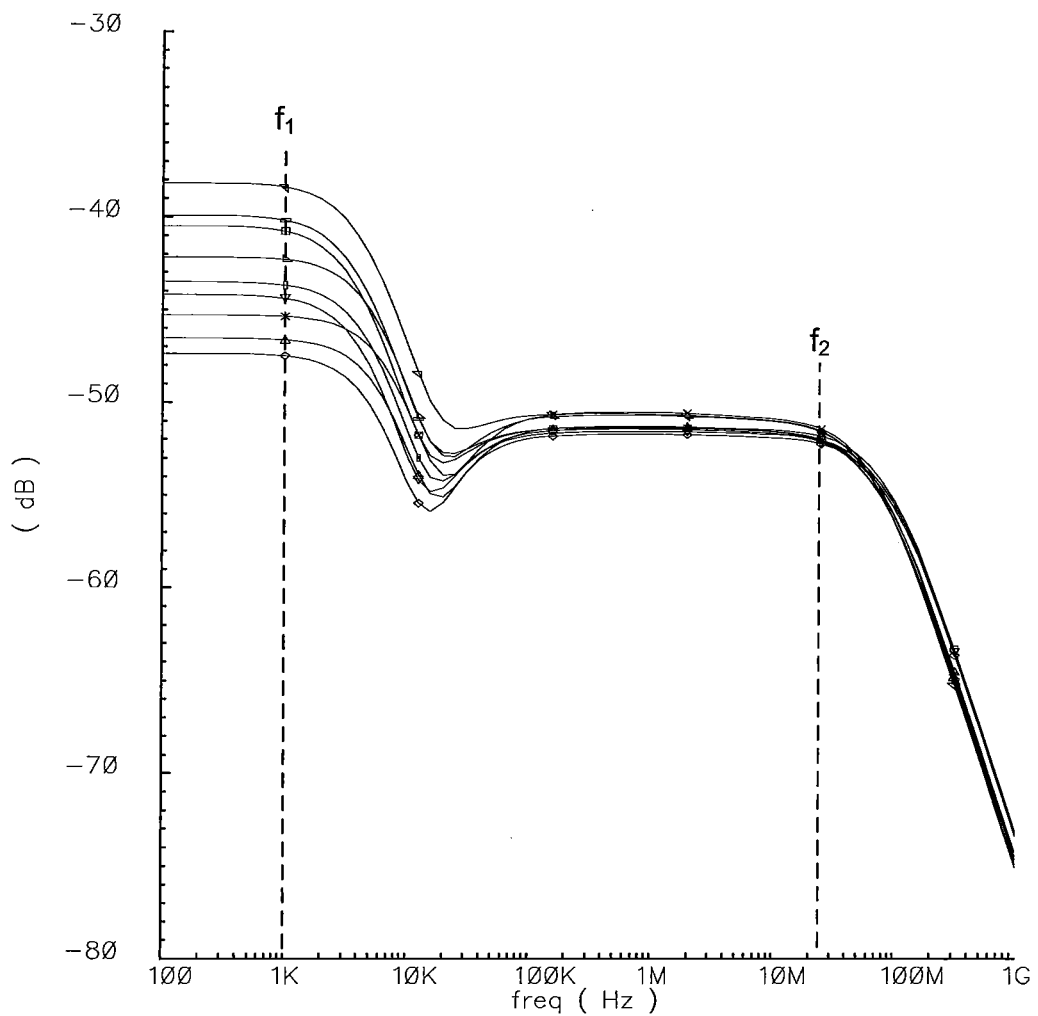
FIG. 6 is a graphical plot of power rejection vs. frequency for the circuit of FIG. 5.

FIG. 6 is a graphical plot showing power rejection (PR) in dB vs. frequency (f) for the circuit of FIG. 5, up to a maximum frequency of 8 GHz. Noise rejection at frequency $f_1$ is below −35 dB, which is similar to the prior art circuit of FIG. 2, however, noise rejection improves as the frequency of the noise increases past $f_1$, and then again after $f_2$. In the present example, $f_1$ can be about 1 kHz, and $f_2$ can be about 25 MHz. It is notable that the noise rejection is at least 50 dB at 8 GHz. Therefore, power supply noise rejection is effective across both low and high frequencies where the power supply noise is more prevalent. More significantly, the noise rejection of at least 50 dB occurs at the frequency band of 1 GHz to 8 GHz, which is the typical frequency range for mobile phone applications to which the embodiments of the present invention can be applied to.

Figure 7:
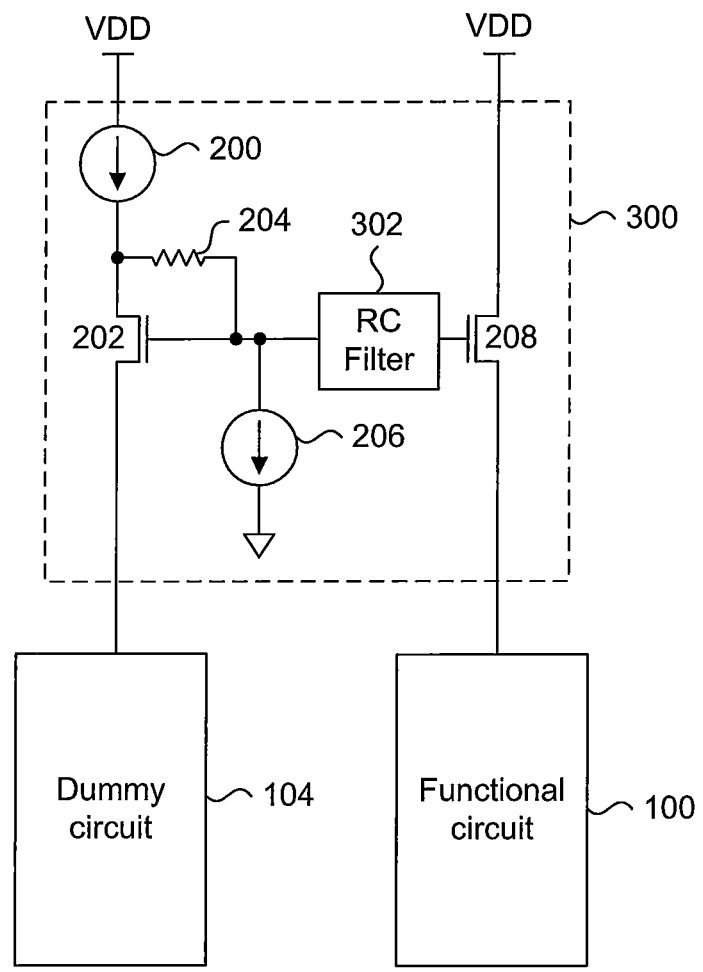
FIG. 7 is a circuit schematic of a modified power supply rejection circuit of FIG. 5, according to an alternate embodiment.

The power supply rejection circuit shown in FIG. 5 can be modified to further improve its immunity to noise. FIG. 7 is a circuit schematic of the circuit of FIG. 5, but modified to minimize noise from current source 200. The circuit of FIG. 7 includes all the previously described components of FIG. 5, except that functional circuit 100 and dummy circuit are shown as blank boxes 100 and 104 respectively to illustrate that any functional circuit and matching dummy circuit emulating the DC characteristics of the functional circuit can be used. The current supply circuit 300 of FIG. 7 now includes a filter means 302 between the gate terminals of reference transistor 202 and isolation transistor 208. Filter means 302 can be implemented as a well known RC filter, and is used in the present embodiment to filter any noise from current source 200 which would otherwise reach isolation transistor 208 and appear in the output current provided to the functional circuit 100. Accordingly, PSRR is further improved in the embodiment of FIG. 7.

Figure 8:
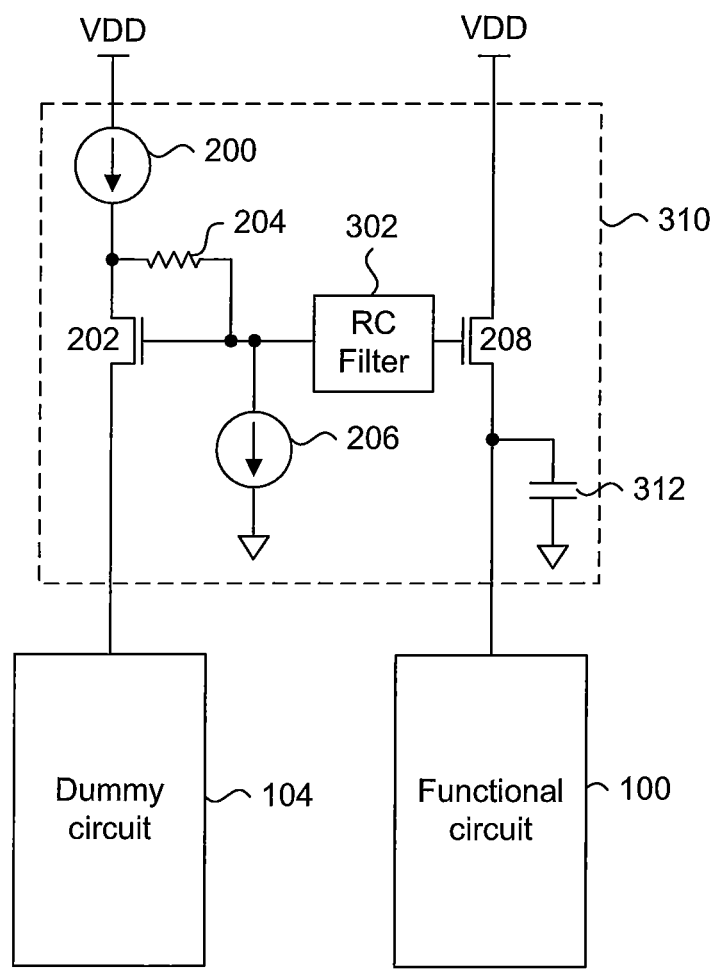
FIG. 8 is a circuit schematic of a modified power supply rejection circuit of FIG. 7, according to another alternate embodiment.

The power supply rejection circuit embodiment of FIG. 7 can be further modified to improve PSRR at high frequencies, such as those greater than 1 GHz for example. FIG. 8 is a circuit schematic of the power supply rejection circuit of FIG. 7, and includes a modification to the current supply circuit 300 of FIG. 7. In FIG. 8, the current supply circuit 310 includes a capacitor 312 to ground connected to the source terminal of isolation transistor 208. Capacitor 312 can be any type of capacitor, and is effective for improving PSRR at frequencies greater than 1 GHz. The capacitance value of capacitor 312 can be selected to obtain this desired result.

Figure 9:
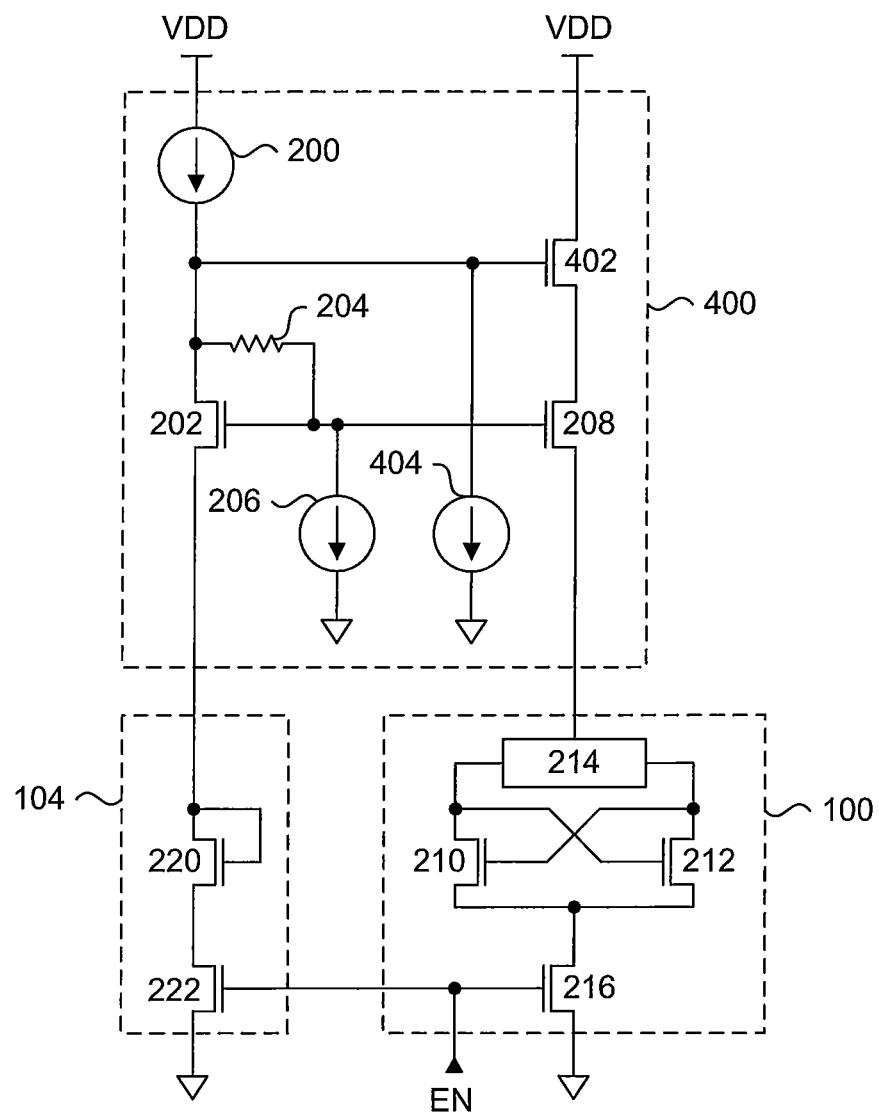
FIG. 9 is a circuit schematic of a VCO circuit having full frequency range power supply rejection, according to another embodiment of the present invention; and, FIG. 10 is a circuit schematic of a modified power supply rejection circuit of FIG. 9, according to a present embodiment.

FIG. 9 is a circuit schematic showing details of a power supply rejection circuit according to another embodiment of the present invention, connected to a functional circuit. In the previously shown embodiments, the isolation transistor 208 is sized to provide large current, but at higher frequencies it can behave like a capacitor, which thus limits the PSRR. In the presently shown embodiment of FIG. 9, the power supply rejection circuit includes a current supply circuit 400 and dummy circuit 100. The example dummy circuit 100 is shown to include the same elements as the one shown in FIG. 5, and the functional circuit 100 is shown to include the same VCO circuit as the one shown in FIG. 5. The current supply circuit 400 includes the same circuit elements as the current supply circuit 102 of FIG. 5, but now includes the addition of an n-channel cascade device 402 between the VDD power supply voltage and isolation transistor 208. Cascade device 402 can be a native device having a low threshold voltage. An additional current source 404 is connected between the gate terminal of cascade device 402 and ground, and acts as a bleed means for the gate of cascade device 402. The cascade device 402 further isolates the functional circuit 100 from the VDD power supply.

Figure 10:
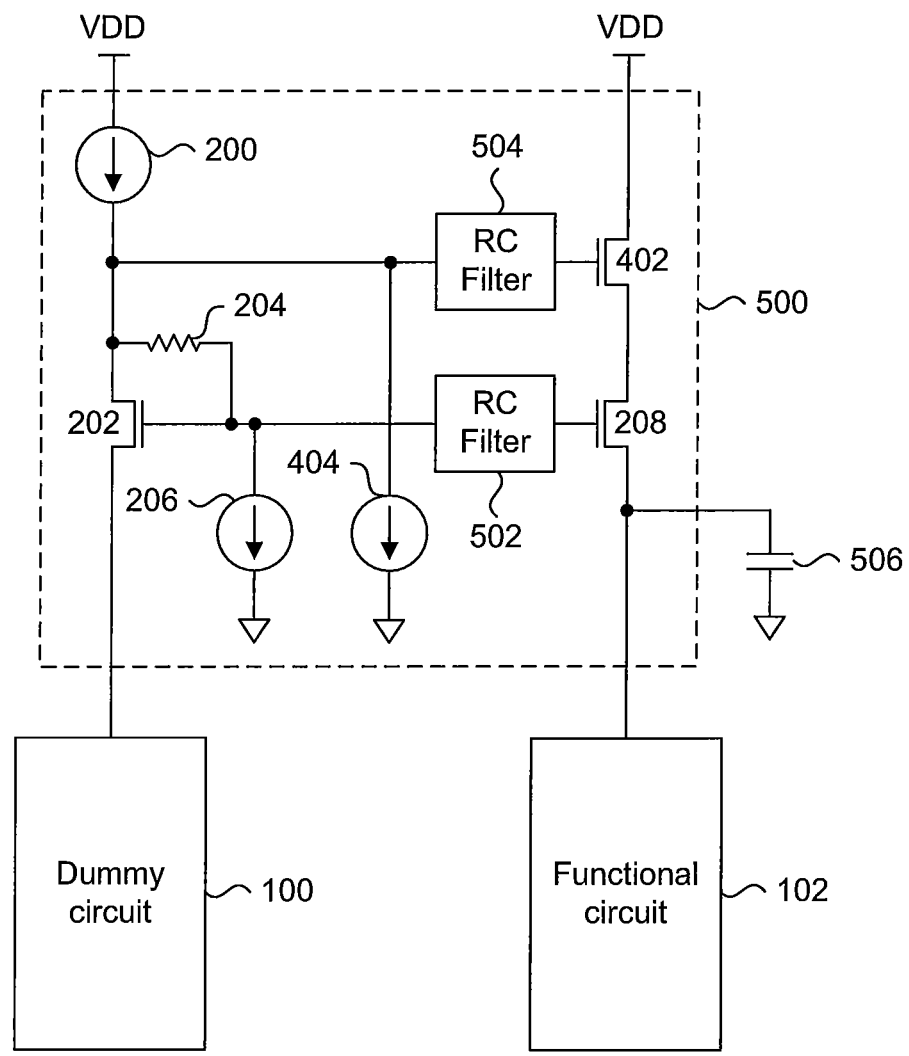

The previously shown enhancements to the power supply rejection circuit of FIGS. 7 and 8 can be applied to the circuit of FIG. 9. FIG. 10 is a circuit schematic of an alternate power supply rejection circuit to the one shown in FIG. 9. In FIG. 10, the power supply rejection circuit includes current supply circuit 500 and dummy circuit 100. The current supply circuit 500 includes all the circuit elements of the current supply circuit 400 of FIG. 9, but adds a first filter means 502, a second filter means 504, and a capacitor 506. The first filter means 502 is connected between the gate terminals of reference transistor 202 and isolation transistor 208, while second filter means 504 is connected between the current source 200 and the gate terminal of cascade device 402. In the present examples, the first and second filter means can be implemented as RC filters. The capacitor 506 is connected in the same way as capacitor 312 of FIG. 8. The RC filters reduce noise from the current source 200 from reaching cascade device 402 and isolation transistor 208, while the capacitor 506 improves PSRR at high frequencies.

The previously described embodiments of the power supply rejection circuit are effective for rejecting power supply noise at low and high frequencies. The power supply rejection circuit embodiment does not use any capacitor elements, thereby resulting in a circuit with a small footprint that uses a minimal amount of semiconductor area. The functional circuit 102 is not limited to the disclosed VCO circuit, and can be any circuit which requires a current source and can benefit from good PSRR.

In the preceding description, for purposes of explanation, numerous details are set forth in order to provide a thorough understanding of the embodiments of the invention. However, it will be apparent to one skilled in the art that these specific details are not required in order to practice the invention. In other instances, well-known electrical structures and circuits are shown in block diagram form in order not to obscure the invention. For example, specific details are not provided as to whether the embodiments of the invention described herein are implemented as a software routine, hardware circuit, firmware, or a combination thereof.

Embodiments of the invention can be represented as a software product stored in a machine-readable medium (also referred to as a computer-readable medium, a processor-readable medium, or a computer usable medium having a computer-readable program code embodied therein). The machine-readable medium can be any suitable non-transitory tangible medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the invention. A non-transitory media includes all computer-readable media except for a transitory, propagating signal. Those of ordinary skill in the art will appreciate that other instructions and operations necessary to implement the described invention can also be stored on the machine-readable medium. Software running from the machine-readable medium can interface with circuitry to perform the described tasks.

The above-described embodiments of the invention are intended to be examples only. Alterations, modifications and variations can be effected to the particular embodiments by those of skill in the art without departing from the scope of the invention, which is defined solely by the claims appended hereto.

What is claimed is:

1. A power supply rejection circuit for a functional circuit comprising:
a dummy circuit for receiving a reference current, the dummy circuit having circuit elements for emulating DC characteristics of the functional circuit; and
a current supply circuit receiving a voltage supply for providing the reference current to the dummy circuit and an output current substantially free of noise in response to the reference current for the functional circuit, the reference current having a magnitude determined by the DC characteristics of the dummy circuit.

2. The power supply rejection circuit of claim 1, wherein the functional circuit includes a voltage controlled oscillator.

3. The power supply rejection circuit of claim 1, wherein the current supply circuit includes an isolation transistor coupled to the voltage supply for providing the output current in response to a bias voltage applied to a gate terminal of the isolation transistor.

4. The power supply rejection circuit of claim 3, wherein the current supply circuit includes a capacitor connected between a source terminal of the isolation transistor and ground.

5. The power supply rejection circuit of claim 3, wherein the current supply circuit includes a current source and a reference transistor connected in series between the voltage supply and the dummy circuit, the reference transistor being a diode-connected n-channel transistor connected to the gate terminal of the isolation transistor.

6. The power supply rejection circuit of claim 5, wherein the current supply circuit includes a filter means for preventing noise of the current source from reaching the isolation transistor.

7. The power supply rejection circuit of claim 6, wherein the filter means includes an RC filter.

8. The power supply rejection circuit of claim 5, wherein the isolation transistor and the reference transistor are native n-channel transistors having negative threshold voltages.

9. The power supply rejection circuit of claim 8, wherein the current supply circuit includes a bleed means for drawing current from a gate terminal of the reference transistor to ground.

10. The power supply rejection circuit of claim 5, wherein the reference transistor is maintained in a saturation mode of operation.

11. The power supply rejection circuit of claim 10, wherein the current supply circuit includes a resistance means connected between the reference transistor gate terminal and drain terminal, and a bleed means for drawing current from the gate terminal of the isolation transistor to another voltage supply.

12. The power supply rejection circuit of claim 5, wherein the current supply circuit includes a cascade device connected between the voltage supply and the isolation transistor, a gate terminal of the cascade device being connected to the current source.

13. The power supply rejection circuit of claim 12, wherein the cascade device is an n-channel native transistor, and the current supply circuit includes a bleed means for drawing current from the gate terminal of the cascade device.

14. A power supply rejection circuit for providing an output current comprising:
a current source connected to a high voltage supply for providing a current;
a first transistor having a first drain terminal for receiving the current, and a first source terminal;
resistance means connected between the first drain terminal and a first gate terminal of the first transistor;
a dummy circuit connected to the first source terminal having specific DC characteristics for setting a bias voltage of the first gate terminal;
a second transistor having a second drain terminal coupled to the high voltage supply, a second gate terminal connected to the first gate terminal, and a second source terminal for providing the output current; and
bleed means for drawing voltage from the first gate terminal.

15. The power supply rejection circuit of claim 14, wherein the first transistor and the second transistor are native n-channel transistors having negative threshold voltages.

16. The power supply rejection circuit of claim 14, further including filter means between the first gate terminal of the first transistor and a second gate terminal of the second transistor.

17. The power supply rejection circuit of claim 14, further including a capacitor to ground connected to the second source terminal of the second transistor.

18. The power supply rejection circuit of claim 14, further including a third transistor connected between the high voltage supply and the second drain terminal of the second transistor.

19. A wireless transceiver comprising:
a voltage controlled oscillator (VCO);
an isolation transistor coupled between a voltage supply and the VCO, the isolation transistor providing an output current in response to a bias voltage received at the isolation transistor gate terminal;
a reference transistor for providing a reference current in response to a current derived from a voltage supply;
a resistance means for coupling the current to the reference transistor gate terminal, the resistance means establishing the bias voltage in response to the reference current; and
a dummy circuit for mimicking DC characteristics of the VCO, the dummy circuit regulating a magnitude of the reference current.

* * * * *